(No Model.)
A. S. PIATT.
BAND CUTTING FEEDER FOR THRASHERS.
No. 327,587. Patented Oct. 6, 1885.
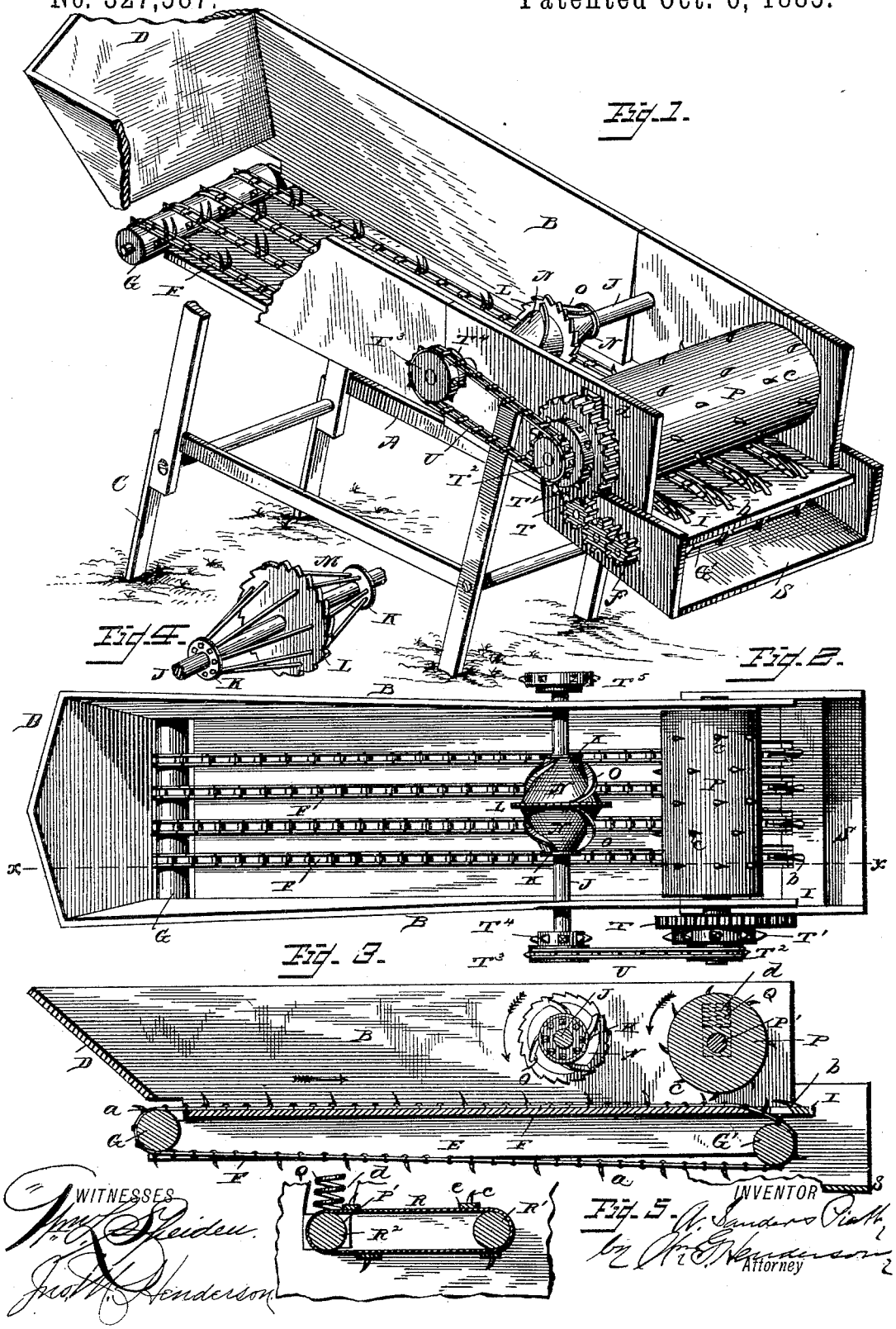

UNITED STATES PATENT OFFICE.

A. SANDERS PIATT, OF MAC-O-CHEEK, OHIO.

BAND-CUTTING FEEDER FOR THRASHERS.

SPECIFICATION forming part of Letters Patent No. 327,587, dated October 6, 1885.

Application filed February 28, 1885. Serial No. 157,354. (No model.)

*To all whom it may concern:*

Be it known that I, A. SANDERS PIATT, a citizen of the United States, residing at Mac-o-cheek, in the county of Logan and State of Ohio, have invented certain new and useful Improvements in Band-Cutting Feeders for Thrashers; and I do hereby declare the following to be a full, clear, and exact description of the invention, such as will enable others skilled in the art to which it appertains to make and use the same.

My invention relates to that class of band-cutters for thrashing-machines in which the band to the sheaf is cut and the grain spread and fed to the thrasher; and it has for its object to simplify and cheapen the construction and increase the efficiency of such machines; and to these ends the invention consists in the construction and also in the combination of parts, hereinafter particularly described and then sought to be specifically defined by the claims.

In the drawings hereto annexed and forming part of this specification, Figure 1 is a perspective of the machine; Fig. 2, a plan view thereof; Fig. 3, a vertical longitudinal section through the line *x x* of Fig. 2; Fig. 4, a perspective of the frame of the cutter and cone-spreader. Fig. 5 is a view of a modified form of endless feeder.

In the drawings, the letter A designates a frame supporting the trough B, and provided at one end with folding legs C, by which the inclination of the machine with relation to a thrasher may be regulated.

The trough preferably has outwardly-flaring sides, and at one end is formed with a hopper, D, for feeding the sheaves thereto, and in its bottom is an endless carrier, E, composed of a series of belts, or, preferably, sprocket-chains, F, of which there may be any desired number, three being illustrated. These chains are supported at opposite ends of the trough by sprocket shafts or rollers G and G', and travel over the bottom of the trough in the direction of the end next to the thrasher and beneath it in the reverse direction. The links of the chain preferably at their joints are provided with one or more fingers, *a*, (two being illustrated,) which curve backwardly in the opposite direction to the movement of the carrier, so as to hold back the grain and prevent it from moving too rapidly forward. By curving the fingers backwardly they withdraw from the grain at the end of the trough, where the carriers turn and pass beneath its bottom, and thus avoid pulling any of the straw down with them.

To further guard against any straw passing down beneath the trough at that end, the bottom of the trough is notched or recessed at points along its edge, preferably on a curve, as shown, for the easy and gradual turning of the carrier, and in front of said notched or recessed edge there is placed a bar or plate, I, having notches or recesses in its edge corresponding to those opposite in the bottom of the trough, and from this plate or bar over the openings thus formed there project fingers or tongues *b*, preferably made of steel, which prevent the downward passage or dribbling of straw.

Inside the trough and across it there is journaled in its sides a shaft, J, which has keyed or otherwise secured to it inside the trough two disks or plates, K, and also intermediate of said plates a disk or plate, L, preferably of larger diameter than the disks K and formed with a cutting-edge, which is preferably, though not necessarily, of the serrated or toothed form, as shown. The disks K have a sharpened perimeter, so that they, too, may serve as cutters, though, if so desired, their edges may be dull, so as not to serve as cutters.

From one disk to the other there extends a number of rods, M, the rods passing the central disk, L, at a point higher than where they pass through the disks K, so as to form an arched support for the cone-spreaders N, which are made in shell form and secured to their arched support and the end disks by solder, rivets, hooks, or otherwise. The ends of the rods M are screw-threaded, and nuts are applied to them outside of the disks K, so as to hold them in place; but they may be otherwise secured. The said rods also strengthen the central cutter and brace it against any side play or wabble.

Diagonally across the cone-spreaders from the central cutter outwardly there extend lateral blades O, which have their edges sharpened, so as to serve as cutters to assist the other cutters in severing the band, and to reach the band if it should not pass under the other cutters.

Within the trough B, at one end, above the endless carrier and beneath the top edges of the sides of the trough, and situate between the thrasher-cylinder and revolving cutters, there is journaled a roller or drum, P, provided on its periphery with a series of fingers, c, curved in the direction of the thrasher end of the trough, or the opposite direction to the rotation of the drum, so that on the lower side of the roller the curve of the teeth will stand in the same relation to the moving grain that the teeth on the endless carrier stand. These teeth prevent the grain from moving forward too fast, while at the same time they feed forward the grain after it passes from under the cutters. The shaft of said drum is journaled in boxes P', which have a vertical movement in slots $d$, formed in the sides of the trough, and above these boxes are springs Q, designed to exert a downward pressure on the boxes, so that the roller will yield to any unusual pressure from below, and thus not be injured by nor injure the grain or straw passing beneath it. The spring is illustrated as a coil-spring, but any equivalent may be used—as, for instance, a rubber or other elastic cushion. The feeding motion and downward pressure of this feed roller or drum on the straw is like that of the hands of an operator who presses downward on the straw to hold it back and prevent it from passing too rapidly from the cylinder.

A modification of this drum is illustrated in Fig. 5, in which the letter $R^3$ designates an endless belt supported at one end by the drive-shaft R', and at the other end by the shaft $R^2$, journaled in the boxes P, moving in the slots $d$, in this instance curved and having the springs Q exerting their pressure thereon. The curved fingers $c$ are connected to the endless apron by means of cross-slats $e$. The action in this modification is the same in principle as the revolving drum, but the drum is the better means.

To the thrasher end of the trough, beneath its bottom, there is secured a hopper or chute, S, which has a bottom inclining toward the thrasher. The function of this chute is to catch such seed or grain as may possibly pass through the recessed portions of the trough-bottom and plate or bar in front of it and direct them into the shaker or screen attachment to the thrasher.

The sides of the trough B at the thrasher end are preferably straight instead of inclined, as the remaining portions of the side are.

The shaft of the endless feeder carries a gear-wheel, T, which meshes directly or indirectly with a pinion, $f$, on the shaft G' of the endless carrier, so as to transmit motion to the latter. On the same shaft of the endless feeder are secured sprocket-wheels T' $T^2$, of different diameters, either one of which is connected by means of a sprocket-chain, U, with either one of two sprocket-wheels $T^3$ $T^4$, of different diameters, secured to the shaft J of the cutters and cone-spreaders, so that motion will be imparted from the cutter-shaft to the endless feeder-shaft. By shifting the sprocket-chain U from one sprocket-wheel to another of different diameter the speed of the endless feeder and cutters may be changed.

To the opposite end of shaft J there is secured a sprocket-wheel, $T^4$, with which the chain from the source of power connects to impart motion to the several parts of the band-cutter.

In operation the sheaf is thrown into the trough lengthwise, and it is then fed forward by the endless carrier, and when it reaches the revolving cutter and passes beneath it the band is severed and the straw spread out or thinned by the cone-spreaders. The grain is continued to be carried forward by the carrier, and after passing from under the cutters is assisted in its movement by the endless feeder, between which and the endless carrier it passes, the endless feeder acting on it as hereinbefore stated. After passing from under the feeder it is delivered to the thrasher, as usual, in the best condition for action by the thrasher, and any grain that may perchance fall below the trough is caught by the chute at that end and delivered to the shaker or screen of the thrasher, as before stated.

The construction of parts is simple, and the action of the whole machine is most satisfactory.

Having described my invention and set forth its merits, what I claim is—

1. In a band-cutting feeder for a thrasher, the combination of the trough, the endless carrier in the lower part thereof, provided with backwardly-curved fingers $a$, a cutter for severing the band of the sheaf, and a revolving feeder located between the cutter and the thrasher-cylinder end of the trough, and provided with fingers curved in the opposite direction to the rotation of the feeder, to regulate the feed of the straw from the cutter after the band has been cut, substantially as described.

2. In a band-cutting feeder for a thrasher, the combination of the trough, the endless carrier in the lower part thereof, provided with backwardly-curved fingers $a$, a cutter for severing the band of the sheaf, a revolving feeder located between the cutter and the thrasher-cylinder end of the trough, and provided with fingers curved in the opposite direction to the rotation of the feeder, and an elastic cushion for exerting a downward pressure on said feeder, substantially as described.

3. The combination of the trough provided with the openings, the endless carrier passing through said openings, and the clearing-fingers projecting over said openings in line with said carrier, substantially as described.

4. In a band-cutting feeder for a thrasher, the combination of a trough having recesses formed in its bottom at the thrasher end thereof, a bar in front of said recessed end, having recesses corresponding with those in the bottom of the trough, and provided with fingers or tongues projecting over said recesses, an endless carrier in the trough passing through its recesses, and a cutter for severing the band of the sheaf, substantially as described.

5. In a band-cutting feeder for a thrasher, the combination of a trough, an endless carrier passing through openings at the bottom thereof, fingers or tongues projecting over said openings, a chute below that end of the trough, and a cutter for severing the band of the sheaf, substantially as described.

6. In a band-cutting feeder for a thrasher, the combination of the trough, the endless carrier, the cutter for severing the band that binds the sheaf, the cone-spreaders on opposite sides of the cutter, and the lateral cutters on the cone-spreaders, substantially as described.

7. The combination of the trough, the endless apron, composed of sprocket-chains having rearwardly-curved fingers, the cutter, and the yielding revolving feeder, provided with fingers and located above the carrier in front of the cutter, substantially as described.

8. The shaft H, provided with cone-spreaders L, in combination with the curved rods forming the arched support therefor, and the lateral knives on the outer surface of the cones, substantially as and for the purpose specified.

In testimony whereof I affix my signature in presence of two witnesses.

A. SANDERS PIATT.

Witnesses:
R. N. JORDAN,
I. N. JORDAN.